(12) United States Patent
Liu et al.

(10) Patent No.: US 12,572,298 B2
(45) Date of Patent: Mar. 10, 2026

(54) ADAPTIVE SCANS OF MEMORY DEVICES OF A MEMORY SUB-SYSTEM

(71) Applicant: Micron Technology, Inc., Boise, ID (US)

(72) Inventors: Yang Liu, San Jose, CA (US); Zhongguang Xu, San Jose, CA (US); Murong Lang, San Jose, CA (US); Fangfang Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 188 days.

(21) Appl. No.: 17/579,923

(22) Filed: Jan. 20, 2022

(65) Prior Publication Data

US 2023/0195354 A1 Jun. 22, 2023

Related U.S. Application Data

(60) Provisional application No. 63/292,832, filed on Dec. 22, 2021.

(51) Int. Cl.
*G06F 3/06* (2006.01)

(52) U.S. Cl.
CPC .......... *G06F 3/0653* (2013.01); *G06F 3/0614* (2013.01); *G06F 3/0679* (2013.01)

(58) Field of Classification Search
CPC .... G06F 3/0653; G06F 3/0614; G06F 3/0679; G06F 3/0659; G06F 11/073; G06F 11/076; G06F 11/3409; G06F 3/0619; G06F 3/0652
See application file for complete search history.

(56) References Cited

U.S. PATENT DOCUMENTS

| | | | | |
|---|---|---|---|---|
| 2013/0227200 | A1* | 8/2013 | Cometti | G06F 3/0619 |
| | | | | 711/103 |
| 2015/0187442 | A1* | 7/2015 | Sivasankaran | G11C 29/82 |
| | | | | 365/185.09 |
| 2019/0278498 | A1* | 9/2019 | Dedrick | G06F 3/0616 |
| 2019/0391746 | A1* | 12/2019 | Papandreou | G06F 3/0679 |
| 2020/0159410 | A1* | 5/2020 | Rayaprolu | G06F 3/0679 |
| 2020/0211664 | A1* | 7/2020 | Vashi | G06F 11/3034 |
| 2022/0382540 | A1* | 12/2022 | Davidson | G06F 8/71 |
| 2023/0036616 | A1* | 2/2023 | Kim | G06F 3/0649 |
| 2023/0176782 | A1* | 6/2023 | Hong | G06F 3/061 |
| 2023/0195324 | A1* | 6/2023 | Lee | G06F 3/0619 |
| | | | | 711/103 |

\* cited by examiner

*Primary Examiner* — Kenneth M Lo
*Assistant Examiner* — Jonah C Krieger
(74) *Attorney, Agent, or Firm* — Lowenstein Sandler LLP

(57) ABSTRACT

One or more media scan parameters associated with a memory device are maintained. A number of program erase cycles associated with the memory device is identified. Responsive to determining that the number of program erase cycles satisfies a criterion, one or more adjusted media scan parameters are generated by adjusting the one or more media scan parameters. A media scan of the memory device is performed according to the one or more adjusted media scan parameters.

20 Claims, 5 Drawing Sheets

210

| PEC 211 | No. of Scan Groups 213 | WL Scan Interval 215 |
|---|---|---|
| 0 | 16 | 16 seconds |
| 2,000 | 16 | 12 seconds |
| 4,000 | 16 | 10 seconds |
| 6,000 | 8 | 8 seconds |
| 7,000 | 8 | 6 seconds |

220

| PEC 221 | BEC per Page 223 | Valley Width 225 |
|---|---|---|
| 0 | 300 | 800 |
| 2,000 | 280 | 775 |
| 4,000 | 260 | 750 |
| 6,000 | 240 | 720 |
| 7,000 | 200 | 700 |

230

| Levels 231 | No. of Scan Groups 233 | WL Scan Interval 235 |
|---|---|---|
| Level 0 | 16 | 16 seconds |
| Level 1 | 16 | 12 seconds |
| Level 2 | 16 | 10 seconds |
| Level 3 | 8 | 8 seconds |
| Level 4 | 8 | 6 seconds |

240

| PEC 241 | Threshold metric 243 |
|---|---|
| 1,000 | 1E-10 |
| 2,000 | 1E-9 |
| 4,000 | 1E-8 |
| 8,000 | 1E-7 |

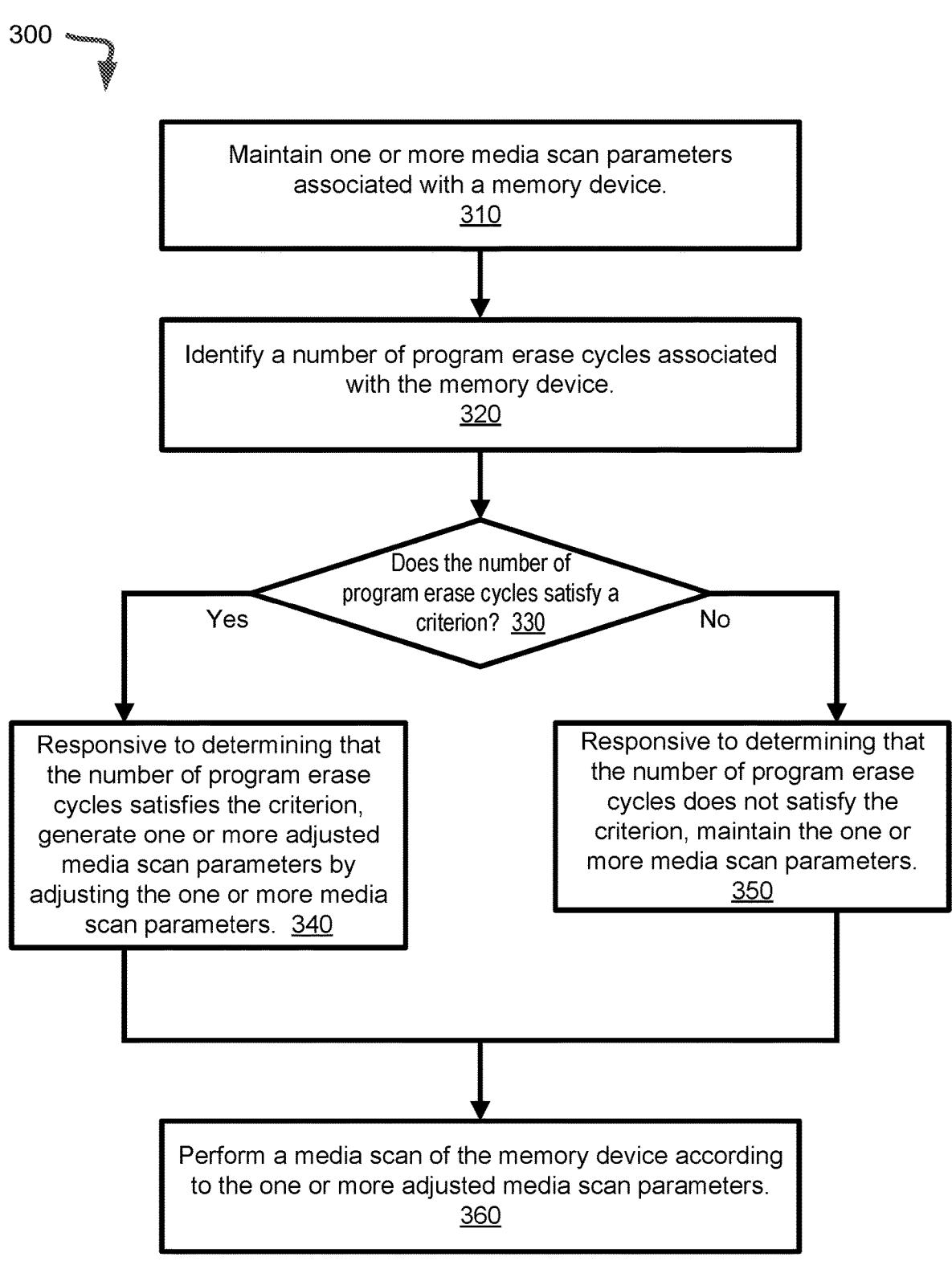

Maintain one or more media scan parameters
associated with a memory device.
310

Identify a number of program erase cycles associated
with the memory device.
320

Does the number of
program erase cycles satisfy a
criterion? 330

Yes

No

Responsive to determining that
the number of program erase
cycles satisfies the criterion,
generate one or more adjusted
media scan parameters by
adjusting the one or more media
scan parameters. 340

Responsive to determining that
the number of program erase
cycles does not satisfy the
criterion, maintain the one or
more media scan parameters.
350

Perform a media scan of the memory device according
to the one or more adjusted media scan parameters.
360

PROCESSING DEVICE 502

INSTRUCTIONS
526

SCAN
MANAGEMENT
COMPONENT
113

MAIN MEMORY 504

INSTRUCTIONS
526

SCAN
MANAGEMENT
COMPONENT
113

NETWORK
INTERFACE
DEVICE
508

NETWORK
520

STATIC MEMORY
506

BUS
530

DATA STORAGE SYSTEM
518

MACHINE-READABLE
MEDIUM 524

INSTRUCTIONS
526

SCAN
MANAGEMENT
COMPONENT
113

ADAPTIVE SCANS OF MEMORY DEVICES OF A MEMORY SUB-SYSTEM

CROSS-REFERENCE TO RELATED APPLICATION

This application claims the benefit of U.S. Provisional Application No. 63/292,832, titled "Adaptive Scans of Memory Devices of a Memory Sub-System," filed Dec. 22, 2021, the entire disclosure of which is incorporated herein by reference.

TECHNICAL FIELD

Embodiments of the disclosure relate generally to memory sub-systems, and more specifically, relate to adaptive scans of memory devices of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 illustrates example lookup tables maintained by a scan management component, in accordance with some embodiments of the present disclosure.

FIG. 3 is a flow diagram of an example method to adaptively adjust the media scan parameters based on the number of program erase cycles of a memory device, in accordance with some embodiments of the present disclosure.

DETAILED DESCRIPTION

Figure 1:
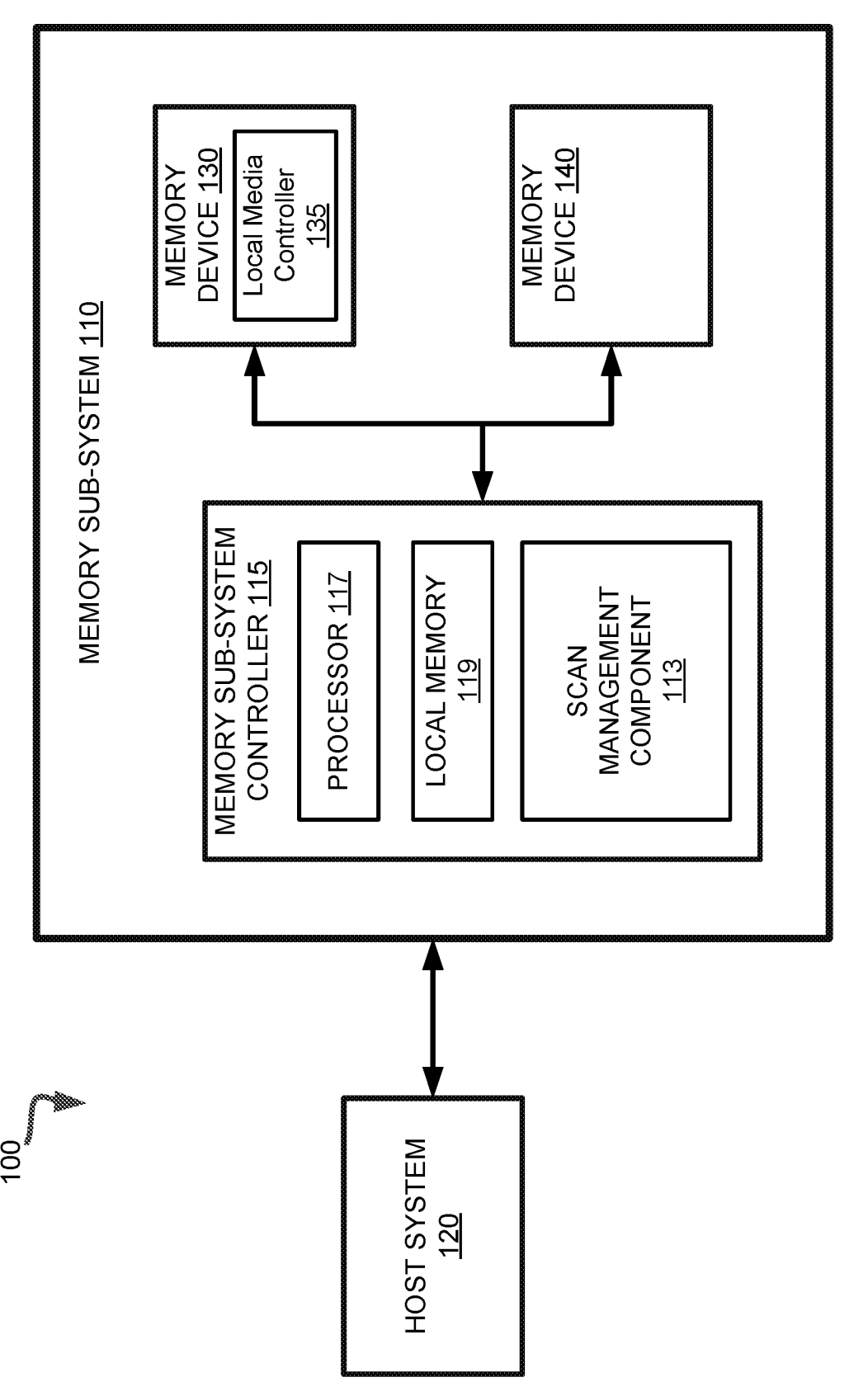
FIG. 1 illustrates an example computing system that includes a memory sub-system in accordance with some embodiments of the present disclosure.

Aspects of the present disclosure are directed to adaptive scans of memory devices of a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

A memory cell can be programmed (written to) by applying a certain voltage to the memory cell, which results in an electric charge being held by the memory cell, thus allowing modulation of the voltage distributions in the memory device. Moreover, precisely controlling the amount of the electric charge stored by the memory cell allows for multiple threshold voltage levels corresponding to different logical levels, thus effectively allowing a single memory cell to store multiple bits of information: a memory cell operated with $2^n$ different threshold voltage levels is capable of storing n bits of information. Thus, the read operation can be performed by comparing the measured voltage exhibited by the memory cell to one or more reference voltage levels in order to distinguish between two logical levels for single-level cells and between multiple logical levels for multi-level cells.

Due to various physical phenomena and operational processes, such as slow charge loss and read disturb, charge levels of memory cells may degrade in time, thus causing higher error rates in memory read operations. Read disturb is a phenomenon where reading data from a memory cell can cause the threshold voltage of unread memory cells in the same block to shift to a different value. Slow charge loss is a phenomenon where the threshold voltage of a memory cell changes in time as the electric charge of the memory cell is degrading.

The resulting memory degradation can be measured by various data state metrics. "Data state metric" herein shall refer to a quantity that is measured or inferred from the state of data stored on a memory device. Specifically, the data state metrics may reflect the state of the slow charge loss, the degree of latent read disturb, the temporal voltage shift, and/or other measurable functions of the data state. A composite data state metric is a function (e.g., a weighted sum) of a set of component state metrics. In an illustrative example, the data state metric can be represented by the raw bit error rate (RBER), which is the number of bit errors experienced by a given data block per unit of time. As another example, the data state metric can include a bit error count per page. As yet another example, the data state metric can include a valley center shift or a valley width threshold measurement. The term "valley" can relate to the shape of a graph generated by the multiple non-overlapping distributions. The distributions (valleys) are interspersed with voltage intervals ("valley margins") where none (or very few) of the memory cells of the device have their threshold voltages. Such valley margins can, therefore, be used to separate various charge states.

The speed of memory degradation is highly dependent on the number of program erase cycles (PEC) associated with the memory device. The number of PEC refers to the number of times a group of memory cells is erased and subsequently programmed with new data. Toward the memory device's end of life, as the memory device's PEC increases, memory degradation can occur more aggressively. In order to mitigate the memory degradation, data integrity check operations (also referred to herein as "scan operations") can be periodically performed on the memory device. The data integrity check can involve evaluating one or more data state metrics on one or more blocks of the memory device. Should the data integrity check indicate that one or more data state metrics fail to satisfy respective quality criteria (e.g., the RBER exceeds a predefined threshold, the bit error count per page exceeds a predefined threshold, and/or the valley width of a particular threshold level exceeds a predefined threshold), one or more media management operations can be performed on the affected blocks in order to mitigate the detected memory degradation. In an illustrative example, the media management operations can include refresh, or "folding," operations, which involve relocating the data stored at an affected block of the memory device to another block.

In conventional memory sub-systems, the frequency of the scan operations can be performed based on a predetermined, static time interval. Additionally, the predefined thresholds for the data state metrics that dictate whether media management operations are to be performed can also be static. In conventional memory sub-systems, both the predetermined time interval and the predefined thresholds are based on end-of-life specifications of the memory device. That is, conventional memory sub-systems define the static scan frequency time interval and the static predefined data state metric thresholds based on specifications reported at the end-of-life of a memory device. For example, conventional memory sub-systems can perform memory characterizations that determine an error rate at or near the end-of-life of a memory device, and based on that error rate can determine the static scan frequency and static predefined data state metric thresholds to use throughout the entire life of the memory device.

However, because memory degradation is dependent on the number of PECs, using the scan frequency based on the end-of-life specifications of a memory device can result in performing scans too frequently when the memory device has a low PEC count (e.g., near the beginning of life of the memory device). Additionally, using the data state metric thresholds based on the end-of-life specifications can result in performing media management operations too frequently and/or unnecessarily when the memory device has a low PEC count (e.g., near the beginning of life of the memory device). Applying a static scan frequency throughout the lifetime of the memory device can result in unnecessarily over-scanning the memory device, while maintaining the data state metric threshold values throughout the lifetime of the memory device can result in over-folding. Either over-scanning or over-folding can result in reduced performance of the memory device, and can affect the quality of service (QoS) of the memory device.

Aspects of the present disclosure address the above and other deficiencies by having a memory sub-system that adaptively adjusts the scan frequency and/or data state metric thresholds throughout the lifetime of a memory device. The memory sub-system controller can assign, at the beginning of life of the memory device, initial values to media scan parameters. The media scan parameters can be related to the scan frequency and can include, for example, a number of scan groups and a wordline scan interval. Additionally or alternatively, the media scan parameters can be related to the data state metric thresholds and can include, for example, a bit error count per page value and a valley width measurement threshold value.

In embodiments, at the beginning of life of the memory device, the memory sub-system controller can assign initial values to the media scan parameters. As the number of PEC increases, the memory sub-system controller can adjust the media scan parameter values. In embodiments, the memory sub-system controller can maintain one or more media scan parameter look-up tables that list media scan parameter values to be used as the number of PEC increases. For example, a media scan parameter look-up table can list the scan frequency parameters (e.g., a number of scan groups and the wordline scan interval) for a PEC count of 0, a PEC count of 2,000, a PEC count of 4,000, etc. The number of scan groups and the wordline scan interval values can decrease as the number of PEC increases, resulting in increasing the scan frequency of the memory device as the memory device approaches end of life.

As another example, the media scan parameter look-up table can list the folding threshold values, such as a bit error count per page and/or a valley width measurement, for a PEC count of 0, a PEC count of 2,000, a PEC count of 4,000, etc. The folding threshold parameters can decrease as the number of PEC increases, resulting in increasing the media management operations (e.g., folding operations) throughout the life of the memory device. As yet another example, the memory sub-system can determine a performance metric after a certain number of PEC (e.g., every 200 PEC), and can adjust the media scan parameters based on the result of performance metric.

Advantages of the present disclosure include, but are not limited to, preventing over-scanning and over-folding through the lifetime of a memory device while still safeguarding against performance degradation near the end of life of the memory device. By adaptively adjusting the media scan frequency and the folding thresholds based on PEC and/or based on performance, the memory sub-system can avoid unnecessary media scans and folding operations that can themselves degrade the memory device, thus improving the overall performance and quality of service of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDEVIMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a scan management component 113 that can adaptively adjust the media scan parameter values associated with performing scan operations and media management operations through the lifetime of the memory device 130. In some embodiments, the memory sub-system controller 115 includes at least a portion of the scan management component 113. In some embodiments, the scan management component 113 is part of the host system 110, an application, or an operating system. In other embodiments, local media controller 135 includes at least a portion of scan management scan management component 113 and is configured to perform the functionality described herein.

The scan management component 113 can maintain one or more media scan parameter look-up tables. The look-up tables can list which media scan parameter values to use based on the number of PEC for each memory device. In embodiments, the scan management component 113 can identify a PEC count value for each memory device, e.g., memory device 130. In embodiments, the scan management component 113 can maintain a count of the number of PECs for each memory device, or the scan management component 113 can receive the count from another component with the memory sub-system controller 115. At the beginning of life of the memory device 130, the scan management component 113 can assign initial values to the media scan parameters. For example, the media scan parameter look-up table can include an initial value for PEC 0. As the number of PEC increases, the scan management component 113 can determine whether to adjust the media scan parameters based on the media scan look-up tables. Examples of the media scan look-up tables are described with regard to FIG. 2.

The scan management component 113 can perform a scan of the memory device according to the media scan parameters, and responsive to the scan results, can perform media management operations such as a folding operation. The media scan parameters can include parameters that adaptively adjust the frequency of the scan and/or parameters that adaptively adjust the folding threshold values at which the media management operations are performed. For example, the scan operations can include dividing the blocks and/or wordlines within the memory device into a number of scan groups and scanning the wordlines in each scan group according to a wordline scan time interval. Hence, the media scan parameters can be the number of scan groups and the wordline scan time interval. As the number of PEC increases, the number of scan groups and the wordline scan interval can decrease, thus increasing the frequency of the scan operations.

Based on the scan operation, the scan management component 113 can determine a data state metric for the wordlines in the memory device. The scan management component 113 can determine to perform a media management operation (e.g., a folding operation) on the blocks within the memory device that include wordlines for which the data state metric exceeds a folding threshold value. In embodiments, the media scan parameters include folding threshold values, such as a bit error count per page threshold value and/or a valley width threshold value. Hence, the scan management component 113 can adaptively adjust the folding threshold values at which to perform media management operations as the number of PEC increases for a memory device. In embodiments, the bit error count per page threshold value and the valley width value can decrease as the number of PEC increases, thus increasing the number of media management operations performed as the memory device approaches end of life. In some embodiments, the scan management component 113 can adjust media scan parameters that include both frequency of the scan operations and the folding threshold values at which the media management operations are performed based on the PEC count of the memory device.

In embodiments, the scan management component 113 can adaptively adjust the media scan parameters based on a combination of the number of PEC and the performance of the memory device. At certain PEC intervals, the scan management component 113 can determine a performance metric associated with the memory device. For example, for every x number of PEC (e.g., where x=100 PEC), the scan management component 113 can determine a performance for the memory device. The performance metric can be, for example, a raw bit error rate determined with a 10 second write-to-read delay, performed on a subset to blocks within the memory device. If the performance metric exceeds a threshold performance metric value, the scan management component 113 can adjust the media scan parameters. The threshold performance metric value can itself be adaptively adjusted based on the PEC count of the memory device. For example, the threshold performance metric can value increase as the number of PEC increases. If the performance metric exceeds the threshold performance metric value associated with the PEC count of the memory device, the scan management component 113 can increase the media scan parameter values. In one example, the media scan parameter values can be associated with a number of levels, and the scan management component 113 can increase the level of the media scan parameter values as the performance of the memory device deteriorates.

In some embodiments, the scan management component 113 can perform the above described function with respect to segments or portions of each memory device. For example, the look-up tables maintained by the scan management component 113 can list media scan parameters values to use based on the number of PEC for each block, group of blocks, or some other segment of a memory device. In such embodiments, the scan management component 113 can determine the PEC count for the segments (e.g., block, group of blocks, wordlines, group of wordlines, etc.), and can adjust the media scan parameter values based on the number of PECs. The scan management component 113 can further perform scans of the segments based on the adjusted media scan parameter values.

Further details with regards to the operations of the scan management component 113 are described below.

FIG. 2 illustrates example lookup tables 210, 220, 230, 240 maintained by the scan management component, in accordance with some embodiments of the present disclosure. In embodiments, the lookup tables illustrated in FIG. 2 can be combined into fewer data structures or split into additional data structures, and can be stored as data structures other than a table. The lookup tables 210, 220, 230, 240 can be stored in persistent memory within the memory sub-system, for example in memory device 130. In embodiments, the lookup tables 210, 220, 230, 240 can be stored in local memory 119 of FIG. 1.

The scan management component 113 can maintain media scan parameter values for each memory device in the memory sub-system. The media scan parameters can be a number of scan groups and a wordline scan frequency that affect the frequency of the scans, and/or can be a bit error count (BEC) per page and valley width measurement that affect the occurrence of a media management operation. The valley width can represent an amount of voltage margin between distributions representing the level of charge stored on the memory cells. In embodiments, the valley width can be the level 7 distribution for a TLC. The media scan management component 113 can identify the number of program erase cycles associated with each memory device.

The lookup table 210 of FIG. 2 includes a PEC 211 column, a number of scan groups 213 column, and a wordline scan interval 215 column. As the number of PEC for a memory device increases, the scan management component 113 can generated an adjusted number of scan groups and an adjusted wordline scan interval by adjusting the number of scan groups and the wordline scan interval according to the lookup table 210. At the beginning of life, the scan management component 113 can set the number of scan groups and the wordline scan interval for a memory device to the initial values in table 210 at PEC 0, i.e. 16 scan groups and a 16 second wordline scan interval. That means that for each scan of the memory device, the scan management component 113 can divide the blocks and/or wordlines in the memory device into 16 scan groups, and can scan the wordlines in each scan group at a 16 second time interval. Once the memory device reaches 2,000 PEC, the scan management component 113 can adjust the media scan parameters according to table 210. Hence, at PEC 2,000, the number of scan groups can stay at 16 and the wordline scan interval can decrease to 12 seconds. Once the PEC reaches 7,000, for example, the scan management component 113 can decrease the number of scan groups to 8 and decrease the wordline scan interval to 6 seconds, thus increasing the scan frequency of the memory device as it nears end of life.

The lookup table 220 of FIG. 2 includes a PEC 221 column, a bit error count (BEC) per page 223 column, and a valley width 225 columns. The BEC count per page values and the valley width values can be used to determine when to perform media management operations, such as a folding operation. As the number of PEC for a memory device increase, the scan management component 113 can generated an adjusted BEC count per page and an adjusted valley width threshold value by adjusting the BEC count per page and/or the valley width threshold values according to lookup table 220. At the beginning of life, the scan management component 113 can set the BEC per page and the valley width thresholds for a memory device to the initial values in table 220 at PEC 0, i.e., 300 BEC per page and 800 valley width. That means that for each scan of the memory device, the scan management component 113 can determine a bit error count per page and/or a width of the associated valley (e.g., valley 7). If the scan management component 113 determines that the BEC per page value and/or the width of the associated valley exceeds the values in table 220 (i.e., at PEC 0 if the BEC per page exceeds 300 for a page and/or the valley width for valley 7 exceeds 800), the scan management component 113 can determine that the memory device has degraded and can perform media management operations on the affected pages or blocks within the memory device to restore the data (e.g., by executing folding operations). Once the PEC reaches 2,000, the scan management component 113 can adjust the BEC per page threshold to 280 and can adjust the valley width threshold to 775, according to lookup table 220. As the PEC reaches 7,000, for example, the scan management component 113 can adjust the BEC per page threshold to 200 and the valley width threshold to 700, thus protecting against performance degradation near the end-of-life of the memory device.

In embodiments, the scan management component 113 can use lookup tables 230 and 240 together to generated adjusted media scan parameters by adjusting the media scan parameters. The lookup table 230 can include a levels 231 column, a number of scan groups 233 column, and a wordline scan interval 235 column. The lookup table 240 can include a PEC 241 column and a threshold metric 243 column. As the number of PEC for a memory device increases, the scan management component 113 can adjust the number of scan groups and the wordline scan interval according to the levels in lookup table 230 based on the threshold metric 243 in lookup table 240. At the beginning of life, the scan management component 113 can set the number of scan groups and the wordline scan interval for a memory device to the initial values in table 230 at level 0, i.e. 16 scan groups and a 16 second wordline scan interval. Once the PEC reaches 1,000, the scan management component 113 can determine a performance metric associated with the memory device. The performance metric can be, for example, a raw bit error rate (RBER) performed with a 10 second write to read delay. If the performance metric exceeds the threshold metric 243 value in lookup table 240 associated with the PEC count 241, the scan management component 113 can increase the media scan parameter values to the next level in lookup table 230. For example, if at PEC 1,000, the performance metric for the memory device exceeds the threshold in lookup table 240 (i.e., 1E−10), the scan management component 113 can increase the media scan parameters to the values at level 1 in lookup table 230. As another example, if at PEC 2,000 the performance metric for the memory device does not exceed the threshold in lookup table 240 (i.e., 1E−9), the scan management component 113 can keep the media scan parameters at their current values, i.e., the values at level 1 in this example. If at PEC 4,000 the performance metric exceeds the threshold in lookup table 240 (i.e., 1E−8), the scan management component 113 can increase the media scan parameters to the values at the next level, which in this example would be level 2. Hence, the scan management component 113 maintains the level value for the memory device, and increases the scan frequency based on whether the memory device is experiencing performance degradation.

FIG. 3 is a flow diagram of an example method 300 to adaptively adjust the media scan parameters based on the number PEC of a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the scan management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains one or more media scan parameters associated with a memory device. In some embodiments, the media scan parameters can include a number of scan groups and a wordline scan interval. In some embodiments, the media scan parameters can include a bit error count per page value and a valley width value. In some embodiments, the media scan parameters can include any combination of a number of scan groups, a wordline scan interval, a bit error count per page value, and/or a valley width value.

At operation 320, the processing logic identifies a number of program erase cycles associated with the memory device. The number of program erase cycles can be maintained by the memory sub-system controller, for example.

At operation 330, the processing logic determines whether the number of program erase cycles satisfies a criterion. In some embodiments, the processing logic can maintain a media scan lookup table. Each entry in the media scan lookup table can include a program erase cycle count value associated with one or more media scan parameter values. When the number of program erase cycles associated with the memory device matches the program erase cycles count value of one of the entries in the media scan lookup table, the processing logic can determine that the number of program erase cycles satisfies the criterion. If the number of program erase cycles satisfies the criterion, the method proceeds to operation 340; otherwise, the method proceeds to operation 350.

At operation 340, responsive to determining that the number of program erase cycles satisfies the criterion, the processing logic generates one or more adjusted media scan parameters by adjusting the one or more media scan parameters. The processing logic can identify the one or more media scan parameter values associated with the matched entry in the media lookup table, and can adjust (or set) the one or more media scan parameters to the one or more media scan parameters values in the entry.

At operation 350, responsive to determining that the number of program erase cycles does not satisfy the criterion, the processing logic maintains the one or more media scan parameters at their current values. That is, the processing logic can determine not to adjust the one or more media scan parameters.

At operation 360, the processing logic performs a media scan of the memory device according to the one or more adjusted media scan parameters (or according to the one or more media scan parameters, in the event that the number of program erase cycles did not satisfy the criterion). In some embodiments, the one or more media scan parameters (including according to the one or more adjusted media scan parameters) can include a number of scan groups and a wordline scan interval. In such embodiments, performing the media scan of the memory device according to the one or more media scan parameters includes dividing the wordlines of the memory device into scan groups. The number of scan groups is the number included in the media scan parameters. Each scan group can include a number of wordlines. For example, the number of wordlines per scan group can be the total number of wordlines in the memory device divided by the number of scan groups included in the media scan parameters. The processing logic can then determine a data state metric for each wordline, according to the wordline scan interval. The wordline scan interval can be a time interval, and the processing logic can determine a data state metric for each wordline according to the time interval. For example, the wordline scan interval can be i seconds, and the processing logic can determine a data state metric for the first wordline in the scan group at time t, can determine a data state metric for the second wordline in the scan group at time t+i, can determine a data state metric for the third wordline in the scan group at time t+2i, etc.

Responsive to determining that the data state metric associated with one of the wordlines exceeds a folding threshold value, the processing logic can perform a media management operation with respect to the block that includes the wordline associated with the data state metric that exceeds the folding threshold value. The media management operation can be a refresh or folding operation. The folding threshold can be a RBER value, a bit error count per page value, a valley width distribution value, or some other folding threshold value.

In some embodiments, the one or more media scan parameters (including the one or more adjusted media scan parameters) can include a bit error count per page value and a valley width value. In such embodiments, performing the media scan of the memory device according to the one or more media scan parameters can be similar to the process described above, however rather than adjusting the number of scan groups and/or the wordline scan interval, the processing logic can adjust the folding threshold values (i.e., the bit error count per page value and/or the valley width value). Hence, the processing logic can divide the wordlines of the memory device into a predetermined number of scan groups. Each scan group can include a number of wordlines. The processing logic can then determine a data state metric for each wordline, according to a predetermined wordline scan interval. The processing logic can determine whether the data state metric associated with one of the wordlines exceeds at least one of the bit error count per page value or the valley width value. The bit error count per page value and/or the valley width value can be the values included in the media scan parameters associated with the PEC number of the memory device. Responsive to determining that a data state metric associated with one of the wordlines exceeds at least one of the bit error count per page value or the valley width value, the processing logic can perform a media management operation with respect to the block that includes the wordline associated with the exceeding data state metric. The media management operation can be a refresh or folding operation.

In some embodiments, the processing logic can adaptively adjust the number of scan groups, the wordline scan interval, the bit error count per page, and the valley width values according to the PEC count of a memory device. The processing logic can then perform a scan operation according to the four adaptively adjusted values.

Figure 4:
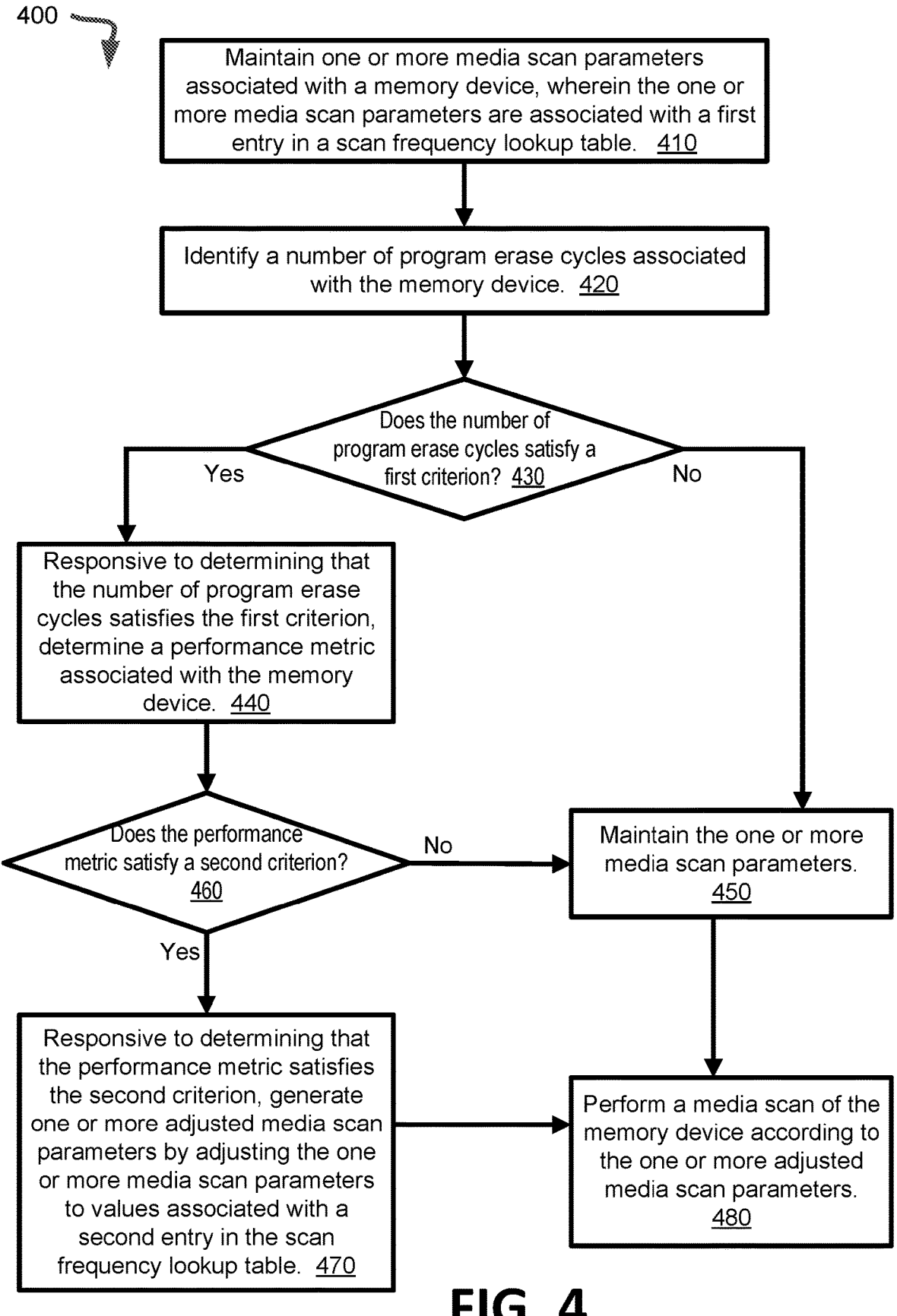
FIG. 4 is a flow diagram of an example method to adaptively adjust the media scan parameters based on a measured performance of a memory device, in accordance with some embodiments of the present disclosure.

FIG. 4 is a flow diagram of an example method 400 to adaptively adjust the media scan parameters based on a measured performance of a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the scan management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains one or more media scan parameters associated with a memory device. The one or more media scan parameters can be associated with a first entry in a scan frequency lookup table. In some embodiments, the media scan parameters can include a number of scan groups and a wordline scan interval.

At operation 420, the processing logic identifies a number of program erase cycles associated with the memory device.

The number of program erase cycles can be maintained by the memory sub-system controller, for example.

At operation 430, the processing logic determines whether the number of program erase cycles satisfies a first criterion. In embodiments, the processing logic can determine that the number of program erase cycles satisfies the first criterion by determining that the number of program erase cycles is a multiple of a predetermined value. As an illustrative example, the predetermined value can be 200, and the processing logic can determine that the number of program erase cycles satisfies the first criterion if the number of program erase cycles is a multiple of 200. Put another way, the number of program erase cycles satisfies the first criterion every 200 cycles. If the number of program erase cycles satisfies the first criterion, the method proceeds to operation 440; otherwise the method proceeds to operation 450.

At operation 440, responsive to determining that the number of program erase cycles satisfies the first criterion, the processing logic determines a performance metric associated with the memory device. In embodiments, the performance metric can be an average raw bit error count associated with a number of blocks in the memory device. For example, the processing logic can select a subset of blocks within the memory device and determine a raw bit error rate with a 10 second write-to-read delay for the subset of blocks.

At operation 460, the processing logic determines whether the performance metric satisfies a second criterion. In embodiments, the processing logic can identify a threshold performance metric value associated with the number of program erase cycles. For example, in some embodiments, the processing logic can maintain a threshold performance metric lookup table. Each entry in the threshold performance metric lookup table can include a program erase cycle count value and an associated threshold performance metric value. The processing logic can identify the threshold performance metric value associated with the number of program erase cycles associated with the memory device. In some embodiments, the threshold performance metric lookup table may not include an entry for each multiple of the predetermined value. That is, to continue the example, the threshold performance metric lookup table may not include an entry for every 200 program erase cycles, but rather may include entries for every 1,000 program erase cycles. In such embodiments, the processing logic can identify the entry with the number of program erase cycles value that is closest the number of program erase cycles associated with the memory device, without exceeding the number of program erase cycles associated with the memory device. The processing logic can determine that the performance metric satisfies the second criterion by determining that the performance metric exceeds the threshold performance metric value associated with the entry in the threshold performance metric lookup table. If the performance metric satisfies the second criterion, the method proceeds to operation 470; otherwise the method proceeds to operation 450.

At operation 470, responsive to determining that the performance metric satisfies the second criterion, the processing logic generates one or more adjusted media scan parameters by adjusting the one or more media scan parameters to values associated with a second entry in the scan frequency lookup table. The scan frequency lookup table can include multiple levels associated with media scan parameter values. For example, the scan frequency lookup table can include levels 0 through 6. Level 0 can be associated with the initial media scan parameter values, and the media scan parameters values can decrease as the levels increase, thus increasing the frequency of the scan operations as the PEC count increases. As such, the second entry in the scan frequency lookup table can be associated with the next level in the table.

At operation 450, the processing logic maintains the one or more media scan parameters at their current values. That is, responsive to determining either that the number of program erase cycles does not satisfy the first criterion, or that the performance metric does not satisfy the second criterion, the processing logic can determine not to adjust the one or more media scan parameters.

At operation 480, the processing logic performs a media scan of the memory device according to the one or more adjusted media scan parameters (or according to the one or more media scan parameters, in the event that the number of program erase cycles did not satisfy the criterion). Performing the media scan of the memory device according to the one or more media scan parameters (including according to the one or more adjusted media scan parameters) can include dividing the wordlines of the memory device into scan groups. The number of scan groups is the number included in the media scan parameters. Each scan group can include a number of wordlines. For example, the number of wordlines per scan group can be the total number of wordlines in the memory device divided by the number of scan groups included in the media scan parameters. The processing logic can then determine a data state metric for each wordline, according to the wordline scan interval. The wordline scan interval can be a time interval, and the processing logic can determine a data state metric for each wordline according to the time interval. For example, the wordline scan interval can be i seconds, and the processing logic can determine a data state metric for the first wordline in the scan group at time t, can determine a data state metric for the second wordline in the scan group at time t+i, can determine a data state metric for the third wordline in the scan group at time t+2i, etc.

Responsive to determining that the data state metric associated with one of the wordlines exceeds a folding threshold value, the processing logic can perform a media management operation with respect to the block that includes the wordline associated with the data state metric that exceeds the folding threshold value. The media management operation can be a refresh or folding operation. The folding threshold can be a RBER value, a bit error count per page value, a valley width distribution value, or some other folding threshold value.

Figure 5:
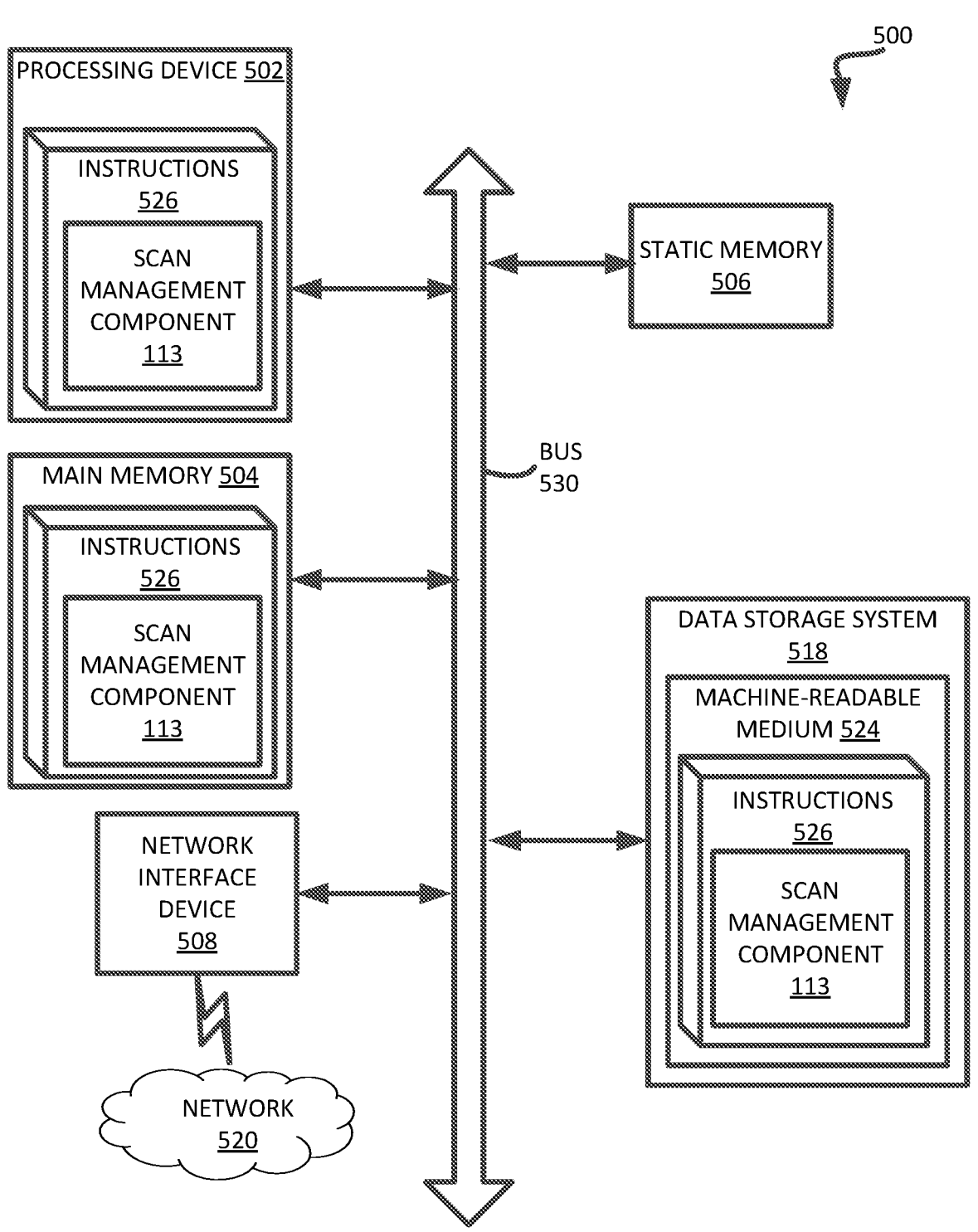
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the scan management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a scan management component (e.g., the scan management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
   maintaining one or more media scan parameters associated with the memory device, wherein the one or more media scan parameters are associated with a frequency for performing media scans of the memory device, and wherein the one or more media scan parameters comprise a wordline scan interval;
   identifying a number of program erase cycles associated with the memory device;
   responsive to determining that the number of program erase cycles satisfies a criterion, generating one or more adjusted media scan parameters by adjusting the one or more media scan parameters, wherein the one or more adjusted media scan parameters increase the frequency for performing the media scans of the memory device by decreasing the wordline scan interval as the number of program erase cycles increases; and
   performing a media scan of the memory device according to the one or more adjusted media scan parameters.

2. The system of claim 1, wherein the media scan parameters comprise a wordline scan interval.

3. The system of claim 2, wherein the memory device comprises a plurality of wordlines, and wherein performing the media scan of the memory device according to the one or more adjusted media scan parameters further comprises:
   dividing the plurality of wordlines into the number of scan groups corresponding to the one or more adjusted media scan parameters;
   determining, according to the wordline scan interval, a data state metric for the wordlines in each scan group; and
   responsive to determining that the data state metric associated with one of the wordlines exceeds a folding threshold value, performing a media management operation with respect to a block comprising the wordline.

4. The system of claim 1, wherein the media scan parameters comprise at least one of a bit error count per page value or a valley width value.

5. The system of claim 4, wherein the memory device comprises a plurality of wordlines, and wherein performing the media scan of the memory device according to the one or more adjusted media scan parameters further comprises:
   dividing the plurality of wordlines into the number of scan groups corresponding to the one or more adjusted media scan parameters;
   determining, according to a wordline scan interval, a data state metric for wordlines in each scan group, wherein the data state metric comprises at least one of a bit error count per page or a valley width; and
   responsive to determining that the data state metric associated with one of the wordlines exceeds at least one of the bit error count per page value or the valley width value, performing a media management operation with respect to a block comprising the wordline.

6. The system of claim 1, wherein determining that the number of program erase cycles satisfies the criterion comprises:

maintaining a media scan lookup table, wherein an entry in the media scan lookup table comprises a program erase count value and one or more media scan parameter values; and determining that the number of program erase cycles matches the entry in the media scan lookup table.

7. The system of claim 6, wherein adjusting the one or more media scan parameters comprises:

setting the one or more media scan parameters to the one or more media scan parameter values in the entry associated with the number of program erase cycles.

8. A method comprising:

maintaining one or more media scan parameters associated with a memory device, wherein the one or more media scan parameters are associated with a first entry in a scan frequency lookup table, wherein the one or more media scan parameters are associated with a frequency for performing media scans of the memory device corresponding to a wordline scan interval, and wherein the first entry comprises a first wordline scan interval;

identifying a number of program erase cycles associated with the memory device;

responsive to determining that the number of program erase cycles has reached a predetermined interval, determining a performance metric associated with the memory device;

responsive to determining that the performance metric satisfies a criterion, generating one or more adjusted media scan parameters by adjusting the one or more media scan parameters to values associated with a second entry in the scan frequency lookup table, wherein the second entry comprises a second wordline scan interval, wherein the second wordline scan interval is less than the first wordline scan interval, and wherein the one or more adjusted media scan parameters increase the frequency for performing the media scans of the memory device by decreasing the wordline scan interval as the number of program erase cycles increases; and performing a media scan of the memory device according to the one or more adjusted media scan parameters.

9. The method of claim 8, wherein the one or more media scan parameters comprise a number of scan groups and the wordline scan interval.

10. The method of claim 9, wherein the memory device comprises a plurality of wordlines, and wherein performing the media scan of the memory device according to the one or more adjusted media scan parameters further comprises:

dividing the plurality of wordlines into the number of scan groups;

determining, according to the second wordline scan interval, a data state metric for the wordlines in each scan group; and responsive to determining that the data state metric associated with one of the wordlines exceeds a folding threshold value, performing a media management operation with respect to a block comprising the wordline.

11. The method of claim 8, wherein determining that the number of program erase cycles satisfies the predetermined interval responsive to determining that the number of program erase cycles is a multiple of a predetermined value.

12. The method of claim 8, wherein the performance metric is an average raw bit error count associated with a number of blocks in the memory device.

13. The method of claim 8, wherein determining that the performance metric satisfies the criterion comprises:

identifying a threshold performance metric value associated with the number of program erase cycles; and determining that the performance metric exceeds the threshold performance metric value.

14. A non-transitory computer-readable storage medium comprising instructions that, when executed by a processing device, cause the processing device to perform operations comprising:

maintaining one or more media scan parameters associated with a memory device, wherein the one or more media scan parameters are associated with a frequency for performing media scans of the memory device, and wherein the one or more media scan parameters comprise a wordline scan interval;

identifying a number of program erase cycles associated with the memory device;

responsive to determining that the number of program erase cycles satisfies a criterion, generating one or more adjusted media scan parameters by adjusting the one or more media scan parameters, wherein the one or more adjusted media scan parameters increase the frequency for performing the media scans of the memory device by decreasing the wordline scan interval as the number of program erase cycles increases; and performing a media scan of the memory device according to the one or more media adjusted scan parameters.

15. The non-transitory computer-readable storage medium of claim 14, wherein the media scan parameters comprise a number of scan groups.

16. The non-transitory computer-readable storage medium of claim 15, wherein the memory device comprises a plurality of wordlines, and wherein performing the media scan of the memory device according to the one or more adjusted media scan parameters further comprises:

dividing the plurality of wordlines into the number of scan groups;

determining, according to the wordline scan interval, a data state metric for the wordlines in each scan group; and responsive to determining that the data state metric associated with one of the wordlines exceeds a folding threshold value, performing a media management operation with respect to a block comprising the wordline.

17. The non-transitory computer-readable storage medium of claim 14, wherein the media scan parameters comprise a bit error count per page value and a valley width value.

18. The non-transitory computer-readable storage medium of claim 17, wherein the memory device comprises a plurality of wordlines, and wherein performing the media scan of the memory device according to the one or more adjusted media scan parameters further comprises:

dividing the plurality of wordlines into a number of scan groups;

determining, according to the wordline scan interval, a data state metric for the wordlines in each scan group, wherein the data state metric comprises at least one of a bit error count per page or a valley width; and responsive to determining that the data state metric associated with one of the wordlines exceeds at least one of the bit error count per page value or the valley width value, performing a media management operation with respect to a block comprising the wordline.

19. The non-transitory computer-readable storage medium of claim 14, wherein determining that the number of program erase cycles satisfies the criterion comprises:

maintaining a media scan lookup table, wherein an entry in the media scan lookup table comprises a program erase count value and one or more media scan parameter values; and determining that the number of program erase cycles matches the entry in the media scan lookup table.

20. The non-transitory computer-readable storage medium of claim 19, wherein adjusting the one or more media scan parameters comprises:

setting the one or more media scan parameters to the one or more media scan parameter values in the entry associated with the number of program erase cycles.

\* \* \* \* \*